(12) United States Patent
Aust et al.

(10) Patent No.: US 9,037,117 B2
(45) Date of Patent: May 19, 2015

(54) WIRELESS COMMUNICATION TERMINAL

(75) Inventors: Stefan Aust, Tokyo (JP); Tetsuya Ito, Tokyo (JP); Akira Matsumoto, Tokyo (JP); Peter Christopher Davis, Kyoto (JP)

(73) Assignee: NEC COMMUNICATION SYSTEMS, LTD., Tokyo (JP)

( * ) Notice: Subject to any disclaimer, the term of this patent is extended or adjusted under 35 U.S.C. 154(b) by 538 days.

(21) Appl. No.: 13/391,077

(22) PCT Filed: Aug. 28, 2010

(86) PCT No.: PCT/JP2010/005189
§ 371 (c)(1),
(2), (4) Date: Mar. 5, 2012

(87) PCT Pub. No.: WO2011/024436
PCT Pub. Date: Mar. 3, 2011

(65) Prior Publication Data
US 2012/0157128 A1     Jun. 21, 2012

(30) Foreign Application Priority Data
Aug. 28, 2009 (JP) .................................. 2009-197774

(51) Int. Cl.
*H04Q 7/10* (2006.01)
*H04W 64/00* (2009.01)
*G01S 5/02* (2010.01)

(52) U.S. Cl.
CPC .............. *H04W 64/00* (2013.01); *G01S 5/0252* (2013.01)

(58) Field of Classification Search
CPC ....... H04W 64/00; H04W 4/02; H04W 4/022; H04W 4/023; H04W 4/106; H04W 4/028; H04W 4/043

USPC ............ 455/414.1, 441, 456.1, 456.2, 456.5; 342/464, 450
See application file for complete search history.

(56) References Cited

U.S. PATENT DOCUMENTS 7,042,391 B2 * 5/2006 Meunier et al. ................ 342/464
7,463,979 B2 * 12/2008 King ............................. 701/469
(Continued)

FOREIGN PATENT DOCUMENTS

JP     06-093650     4/1994
JP     2002-107443   4/2002
(Continued)

OTHER PUBLICATIONS

International Search Report—PCT/JP2010/005189—Sep. 21, 2010.
(Continued)

*Primary Examiner* — Patrick Edouard
*Assistant Examiner* — Julio Perez
(74) *Attorney, Agent, or Firm* — Young & Thompson

(57) ABSTRACT

A wireless communication terminal includes a communication status measurement element for measuring communication status data representing a communication status of the self terminal at the time of wireless communications; a reference data storage element for storing respective pieces of preset reference data representing communication statuses of a terminal which can be measured at respective locations at the time of wireless communications, in association with respective pieces of location data identifying the respective locations, and a location specifying element for comparing the communication status data measured by the communication status measurement element with the respective pieces of reference data stored in the reference data storage element, and based on the comparison result, specifying a location corresponding to the location data associated with a particular piece of reference data as a location of the self terminal.

18 Claims, 9 Drawing Sheets

(56) References Cited

U.S. PATENT DOCUMENTS

| | | | |
|---|---|---|---|
| 7,742,776 B2* | 6/2010 | Annunziato et al. | 455/456.2 |
| 2003/0050077 A1* | 3/2003 | Takeuchi et al. | 455/456 |
| 2003/0216144 A1* | 11/2003 | Roese et al. | 455/456.1 |
| 2005/0150697 A1* | 7/2005 | Altman et al. | 178/19.02 |
| 2007/0049286 A1 | 3/2007 | Kim et al. | |

FOREIGN PATENT DOCUMENTS

| | | |
|---|---|---|
| JP | 2003-283509 | 10/2003 |
| JP | 2003-284156 | 10/2003 |
| JP | 2005-123662 | 5/2005 |
| JP | 2007-537614 | 12/2007 |
| JP | 2008-131302 | 6/2008 |
| JP | 2008-219394 | 9/2008 |
| JP | 2009-141671 | 6/2009 |
| JP | 2009/096358 | 8/2009 |
| WO | 2004066560 | 8/2004 |
| WO | 2009096358 | 8/2009 |

OTHER PUBLICATIONS

JP Office Action dated Aug. 13, 2013, with English translation; Application No. 2009-197774.

JP Office Action dated Nov. 12, 2013, with English Translation; Application No. 2009-197774.

* cited by examiner

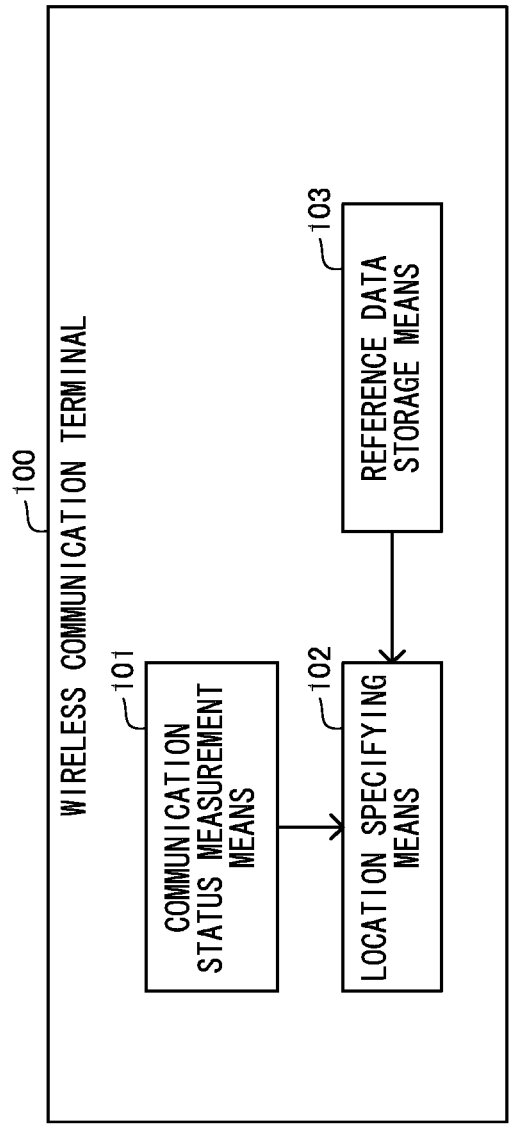

WIRELESS COMMUNICATION TERMINAL

TECHNICAL FIELD

The present invention relates to wireless communication terminals, and in particular, to wireless communication terminals capable of detecting locations.

BACKGROUND ART

Multimode wireless terminals equipped with a plurality of interfaces of different wireless systems such as interfaces for wireless LAN (Local Area Network) conforming to IEEE (the Institute of Electrical and Electronics Engineers, Inc.) 802.11, in addition to interfaces for cellular networks such as 3GPP (Third Generation Partnership Project) and LTE (Long Term Evolution), have been known. Multimode wireless terminals improve user-friendliness by automatically selecting appropriate wireless systems according to shifts in location. For examples, a cellular interface covering a wider area is used outdoors, while a non-chargeable wireless LAN is used indoors.

Further, regarding a wireless LAN of IEEE 802.11a using a 5 GHz band for example, as outdoor use is regulated by the law, wireless modes which can be used indoors and outdoors may be different. As such, automatic switching to a wireless communication mode which is compliant with the regulation, in accordance with shifts in location, leads to an improvement in user-friendliness.

Further, for a user who uses the same wireless communication equipment at home and at the office, manually changing the setting of the wireless communication equipment each time the user moves between home and the office is troublesome. As such, it is desirable that the wireless communication equipment determines whether it is at home or at the office by itself so as to be able to automatically select the wireless mode without being set by the user.

Patent Document 1: JP 2003-283509 A
Patent Document 2: JP 2002-107443 A
Patent Document 3: JP 2005-123662 A
Patent Document 4: JP 06-093650 B As a means for determining the position of a terminal, a system using GPS (Global Positioning System) is typical. However, as it is difficult to capture GPS signals indoors, an accurate position of a wireless communication terminal placed indoors is difficult to identify. While it may be possible to estimate the indoor position using an acceleration sensor or presume whether or not it is located indoors using an optical sensor, providing these sensors to a wireless communication terminal would lead to an increase in the manufacturing cost and an increase in volume of the terminal. As such, such sensors are less likely to be provided to a small and low-priced wireless communication terminal.

Patent Document 1 discloses a method using a six-directional antenna. In this method, whether or not there is a roof or a wall is determined based on a signal reflection time, whereby it is determined whether the wireless communication terminal is indoors or outdoors. However, if both home and the office are in the doors, there is a problem that this method cannot distinguish whether the wireless communication terminal is at home or at the office. Further, as heights of roofs and positions of walls differ one another and any conditions can be expected, there is a problem that the above method is not able to accurately determine whether a wireless communication terminal is indoors.

Patent Document 2 discloses a method of estimating the position of a wireless communication terminal using a survey system. In this method, a wireless communication terminal, which is a target of position estimation, must be positioned within a communication area of a plurality of base stations, and further, the target wireless communication terminal needs to know the positions of those base stations. Further, as this method is a method of surveying a received signal strength indicator (RSSI) measured by a wireless device, it is easily affected by the surrounding environment, leading to a problem of low reliability in the measurement result.

Patent Documents 3 and 4 disclose art of preliminary storing a received field value at a specific position from each base station, and specifying the position of a wireless communication terminal based on the stored received field value and a received field value received by the wireless communication terminal. Even in this case, it is necessary to preliminary store a plurality of received field values, that is, values from at least three base stations, for each location.

In view of the above, the above-described art needs to previously measure received field strengths with respect to a plurality of base stations in order to specify the position of a wireless communication terminal, which needs an extensive configuration and causes a problem of cost increase. Further, because base stations are used, parameters which can be used for specifying the position of a wireless communication terminal are limited to received field values. This also causes a problem of low reliability in the measurement result due to an influence of the surrounding environment.

SUMMARY

As such, an object of the present invention is to provide a wireless communication terminal capable of solving the above-described problems such as a cost increase and low reliability in specifying the position of a wireless communication terminal.

In order to achieve the object, a wireless communication terminal, which is an aspect of the present invention, includes a communication status measurement means for measuring communication status data representing a communication status of the self terminal at the time of wireless communications; a reference data storage means for storing respective pieces of preset reference data representing communication statuses of a terminal which can be measured at respective locations at the time of wireless communications, in association with respective pieces of location data identifying the respective locations; and a location specifying means for comparing the communication status data measured by the communication status measurement means with the respective pieces of reference data stored in the reference data storage means, and based on the comparison result, specifying a location corresponding to the location data associated with a particular piece of reference data as a location of the self terminal.

Further, a program, which is another aspect of the present invention, is a program for causing a wireless communication terminal which stores respective pieces of preset reference data representing communication statuses of a terminal which can be measured at respective locations at the time of wireless communications, in association with respective pieces of location data identifying the respective locations, to realize a communication status measurement means for measuring communication status data representing a communication status of the self terminal at the time of wireless communications, and a location specifying means for comparing the communication status data measured by the communication status measurement means with the respective pieces of stored reference data, and based on the comparison result, specifying a location corresponding to the location data associated with a particular piece of reference data as a location of the self terminal.

Further, a wireless communication method, which is another aspect of the present invention, includes, by a wireless communication terminal which stores respective pieces of preset reference data representing communication statuses of a terminal which can be measured at respective locations at the time of wireless communications in association with respective pieces of location data identifying the respective locations, measuring communication status data representing a communication status of the self terminal at the time of wireless communications; and comparing the measured communication status data with the respective pieces of stored reference data, and based on the comparison result, specifying a location corresponding to the location data associated with a particular piece of reference data as a location of the self terminal.

As the present invention is configured as described above, the position of the self terminal can be specified only with a wireless communication terminal of a simple configuration, and the reliability on specifying the position can be improved at low cost.

BRIEF DESCRIPTION OF DRAWINGS

FIG. 9 is a function block diagram showing the configuration of a wireless communication terminal according to a second exemplary embodiment.

EXEMPLARY EMBODIMENTS

First Exemplary Embodiment

Figure 1:
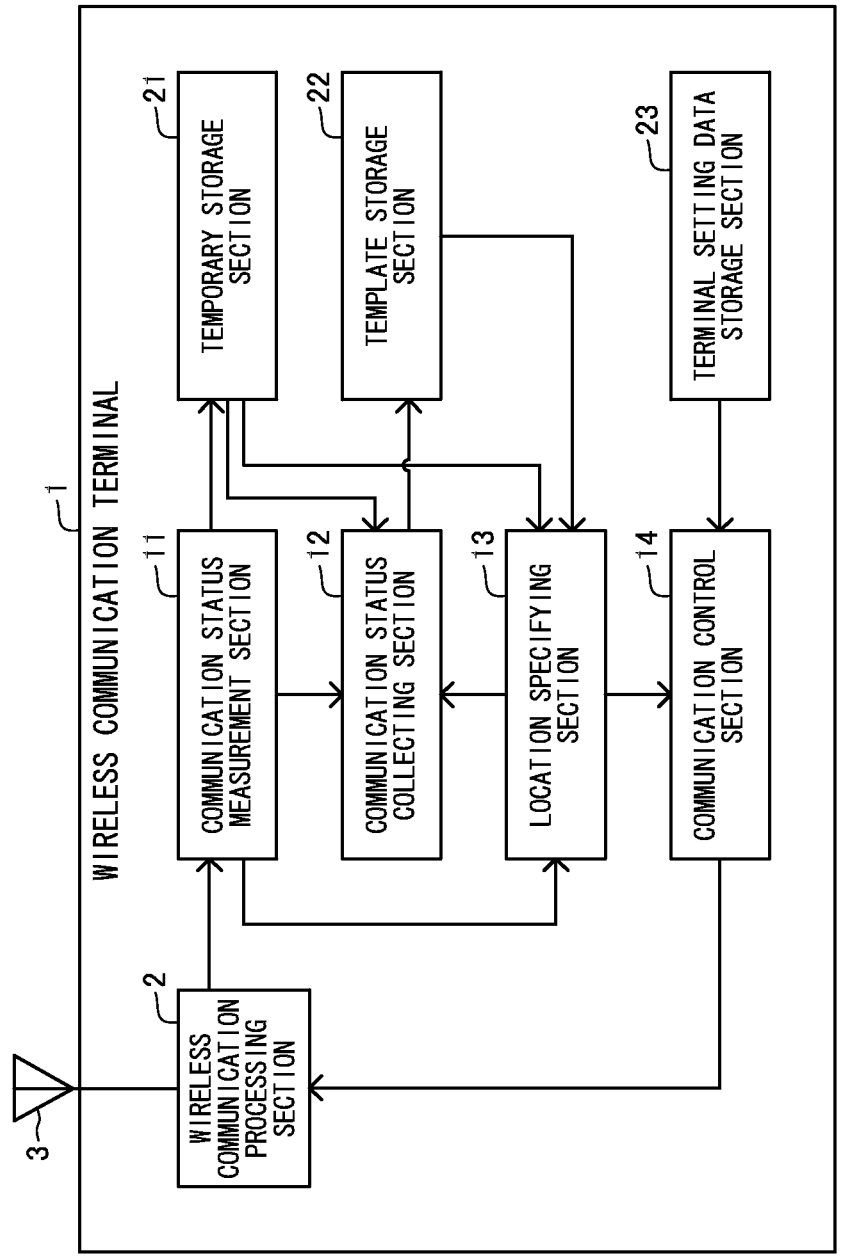
FIG. 1 is a function block diagram showing the configuration of a wireless communication terminal according to a first exemplary embodiment.
Figure 2:
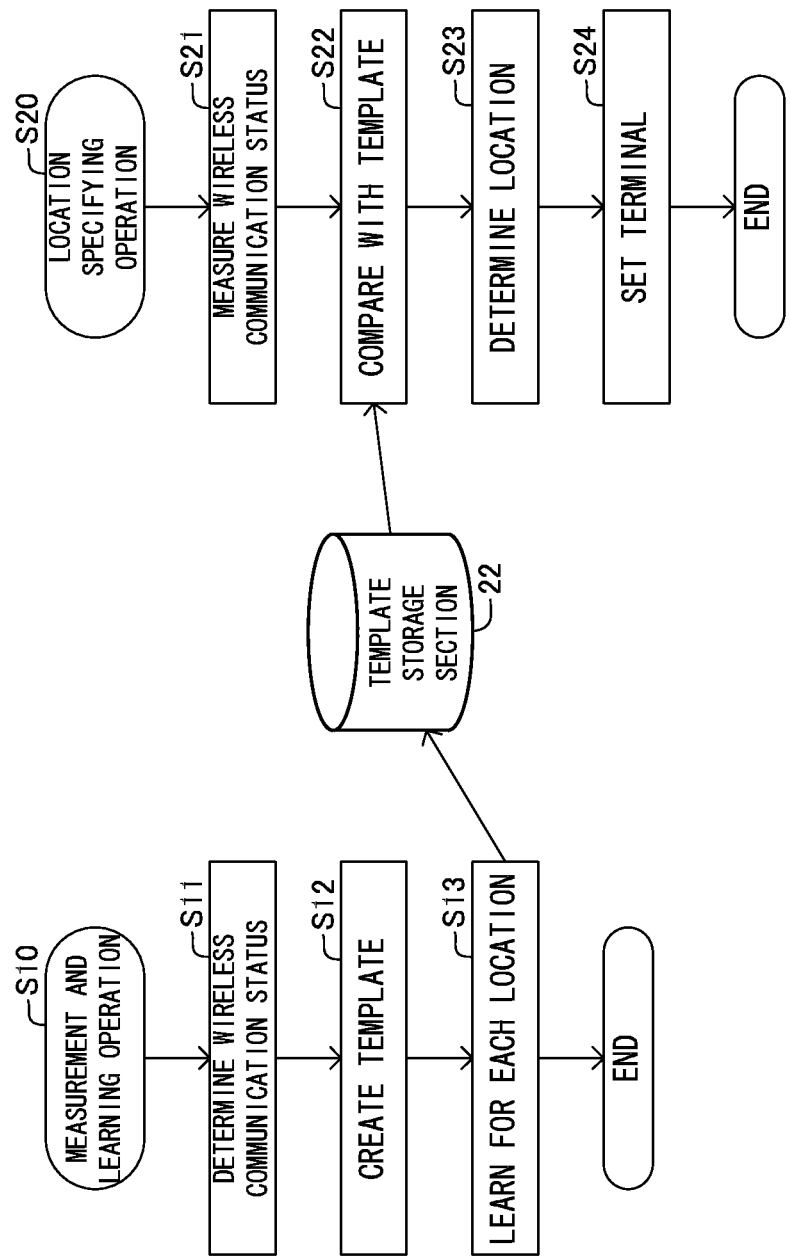
FIG. 2 is a flowchart showing the outline of an operation of the wireless communication terminal disclosed in FIG. 1.
Figure 5:
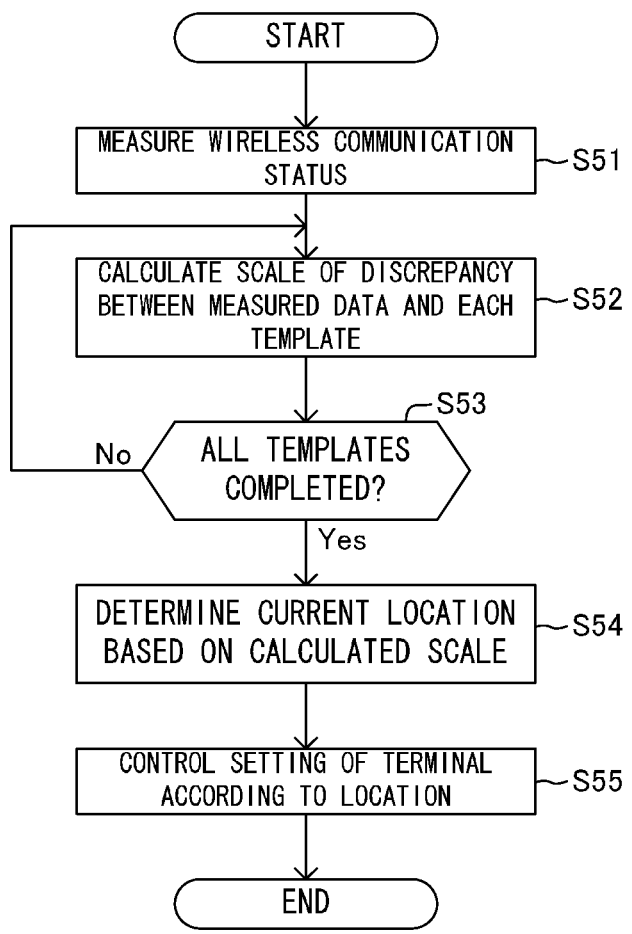
FIG. 5 is a flowchart showing the operation of the wireless communication terminal disclosed in FIG. 1.
Figure 6:
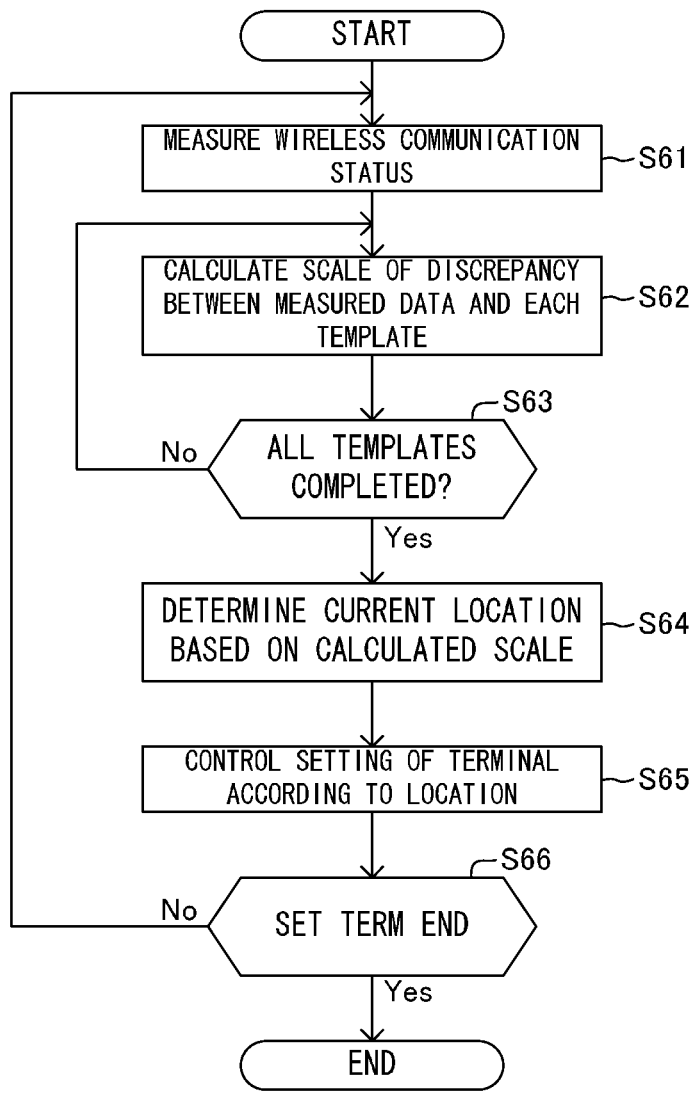
FIG. 6 is a flowchart showing the operation of the wireless communication terminal disclosed in FIG. 1.
Figure 7:
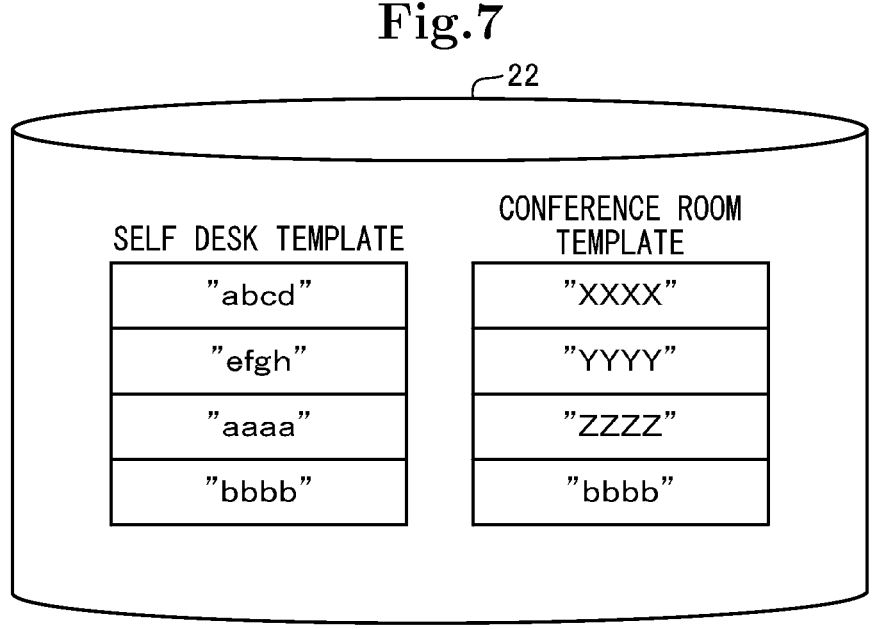
FIG. 7 is an illustration showing a state of location specifying processing performed by the wireless communication terminal disclosed in FIG. 1.
Figure 8:
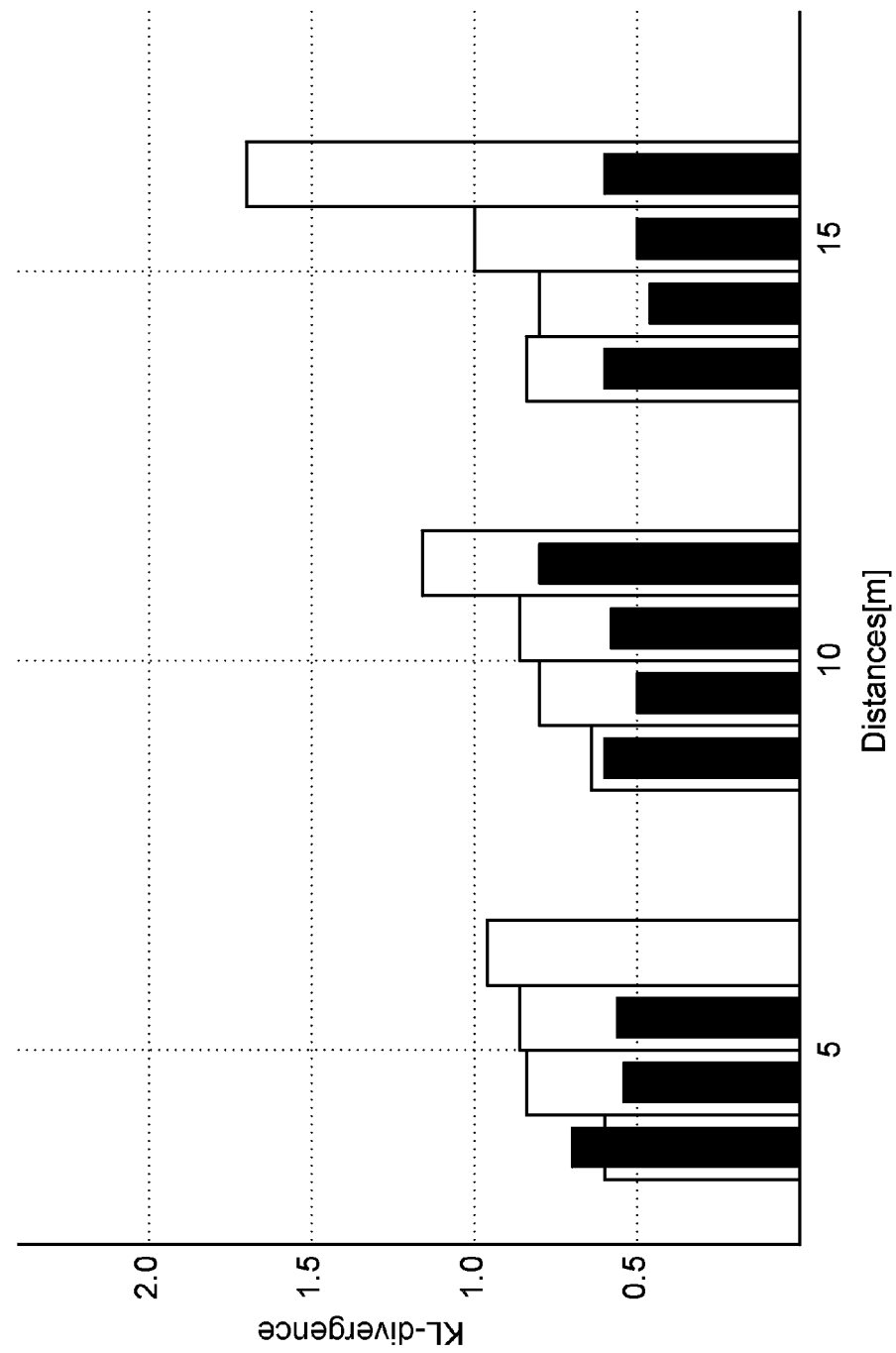
FIG. 8 is a chart showing exemplary results of measuring communication statuses by the wireless communication terminal disclosed in FIG. 1.

A first exemplary embodiment of the present invention will be described with reference to FIGS. 1 to 8. FIG. 1 is a function block diagram showing the configuration of a wireless communication terminal. FIG. 2 is a flowchart showing the outline of an operation of the wireless communication terminal, and FIGS. 3 to 6 are flowcharts showing the details of the operation. FIG. 7 is an illustration showing a state at the time of location specifying processing, and FIG. 8 is a chart showing exemplary results of measuring communication statuses by the wireless communication terminal.

[Configuration]

As shown in FIG. 1, a wireless communication terminal 1 according to the present embodiment includes an antenna 3 for transmitting and capturing radio waves, and a wireless communication processing section 2 which is configured of a communication device and communication protocols and performs transmission and reception of data wirelessly via the antenna. The wireless communication terminal 1 also includes an operation device (not shown) such as a CPU (Central Processing Unit) and a memory (not shown) such as a flash memory.

The wireless communication terminal 1 further includes a communication status measurement section 11, a communication status collecting section 12, a location specifying section 13, and a communication control section 14 as shown in FIG. 1, which are constructed by installing programs in the operation device. Further, the wireless communication terminal 1 includes a temporary storage section 21, a template storage section 22 and a terminal setting data storage section 23, in the memory. It should be noted that the above-mentioned programs may be stored in the memory (not shown) in the wireless communication terminal 1, or provided to the wireless communication terminal 1 by being stored in a storage medium readable by the wireless communication terminal 1. For example, a storage medium may be a portable medium such as a flexible disk, an optical disk, or a semiconductor memory, but not limited to these media.

The communication status measurement section 11 (communication status measurement means) measures communication status data representing a communication status at the time of wireless communications performed by the wireless communication terminal 1. It should be noted that communication status data representing the communication status measured by the communication status measurement section 11 includes QoS (Quality of Service) values such as throughput, delay, and jitter of communication data by the wireless communication terminal 1, network identifiers such as an address and ID (identification), parameters indicating a communication availability status such as the number of retransmissions and the number of CRC (Cyclic Redundancy Check) errors, and parameters of radio physical layer such as signal strength (RSSI (Received Signal Strength Indicator)), noise level (SNR (Signal-Noise Ratio)), surrounding radio wave use statuses in various frequency bands, and a spectrum status. It is possible to use those parameters by combining those of different units or granularity as communication status data, rather than using a single parameter.

If a parameter maintaining a constant value such as a network identifier is used as communication status data, the communication status measurement section 11 notifies the communication status collecting section 12 and the location specifying section 13 of the measurement at the time when the communication status measurement section 11 measures such communication status data. Further, if a parameter in which fluctuations or singular points occur frequently, such as RSSI or SNR, is used as communication status data, after the communication status measurement section 11 measures and accumulates such communication status data for a certain period, the communication status measurement section 11 notifies the communication status collecting section 12 and the location specifying section 13 of the measurement and the accumulation.

Further, the communication status collecting section 12 (reference data registration means) creates a template for each location using various types of communication status data which are measurement values measured for a certain period by the communication status measurement section 11 as described above, and stores it in the template storage section 22. For example, when location data identifying a location is input together with a template study instruction from a user, communication status data is measured by the communication status measurement section 11 for a certain period. The communication status collecting section 12 reads the communication status data from the temporary storage section 21. Then, the communication status collecting section 12 stores the readout communication status data in the template storage section 22 (reference data storage means) as a template (reference data) representing the feature of the communication status data to be measured at that location, in association with the location data. As such, the communication status collecting section 12 stores time-series data of the various types of communication status data measured at each location by the wireless communication terminal 1 itself, together with location data identifying the measurement location. Accordingly, the configuration of a created template includes location data and communication status data such as time-series data of each parameter measured at the location. For example, communication status data measured at home is stored as a home template, and communication status data measured at the office is stored as an office template.

It should be noted that the communication status collecting section 12 may directly store time-series data values of communication status data of each parameter as a template in the temporary storage section 21, or calculate statistical values such as probability distribution, standard deviation, an average value, and the like and store the calculated values as a template. Further, the communication status collecting section 12 may determine a model optimum for describing the phenomenon using MDL (Minimum Description Length) principle for each parameter. Thereby, it is possible to reduce a necessary storage region, and also reduce the amount of calculation in the location specifying processing described below.

Further, the communication status collecting section 12 may distribute a template, created as described above, to other respective wireless communication terminals by wireless communications. Thereby, other wireless communication terminals can have a template configured of various types of communication status data for each location in advance, as a reference for determination to be used in the location specifying processing described below.

The communication status collecting section 12 also has a function of comparing communication status data, currently acquired, and a template which has been stored in the template storage section 22, calculating a scale of discrepancy, and if determining that there is any discrepancy, automatically creating a new template and storing it in the template storage section 22. For example, if communication status data is a single parameter and represented as one value, the communication status collecting section 12 calculates differences between the measured communication status data and the communication status data in the respective stored templates as scales of discrepancies between them, and if all differences are not less than a preset value, stores the measured communication status data as a new template. At this time, the communication status collecting section 12 stores the communication status data in association with location data identifying the location where the communication status data is measured. As such, in that case, as the communication status data has a feature different from that of the registered templates, it is registered as a template serving as a reference for a new location.

It should be noted that a criterion for determining to register measured communication status data as a template, that is, a method of calculating a scale of discrepancy or a criterion for determining that there is a discrepancy from the scale, is arbitrary, and is set in the wireless communication terminal 1 beforehand. For example, in the above example, if the communication status data has a single value, a difference in value from a template may be set as a scale of discrepancy, while in the case of a vector amount, a Euclidean distance may be used as a scale. Further, in the case of the number or a character string such as a network identifier, it is possible to compare them and set the matched number as a scale.

The communication status collecting section 12 also has a function of deleting less frequently used templates from the template storage section 22. For example, the communication status collecting section 12 deletes a template associated with location data of a location which has not been specified for a certain period by the location specifying section 13 described below, from the template storage section 22. A certain period can be set arbitrary, that is, one month, for example.

The location specifying section 13 (location specifying means) specifies the location of the wireless communication terminal 1 where the communication status data is measured, based on the various types of communication status data which are measurement values measured for a certain period by the communication status measurement section 11, as described above. Specifically, the location specifying section 13 compares the communication status data measured by the communication status measurement section 11 with the respective templates stored in the template storage section 22, and calculates the discrepancies between them by means of a predetermined calculation method. At this time, if both the communication status data and the template have a single value, a scale of discrepancy may be a difference between the values, while in the case of a vector amount, a Euclidean distance may be used as a scale. Further, in the case of the number or a character string such as a network identifier, it is possible to compare them and set the matched number as a scale. As described above, a scale of discrepancy between communication status data and a template can be calculated by means of any calculation.

Then, the location specifying section 13 determines discrepancies between the measured communication status data and the respective templates, and specifies a template determined to have a high conformity with the measured communication status data, such as one having a minimum scale of discrepancy which is a difference between them calculated as described above. Then, the location specifying section 13 specifies the "location" indicated by the location data included in the template determined to have a high conformity, as a location of the wireless communication terminal 1.

The communication control section 14 (operation state setting means) receives the location specified by the location specifying section 13, and performs, on the wireless communication terminal 1 itself, a setting process based on the setting data stored in the terminal setting data storage section 23 according to the location. With respect to this process, the terminal setting data storage section 23 (setting data storage means) stores setting data for setting the operation state of the wireless communication terminal 1, which is predetermined for each location. Specifically, setting data is data for setting a wireless mode according to the location or setting parameters of wireless communications to reduce interference according to the location. Further, the setting data may be setting data for securing the security by restricting use of the terminal at a location where use of the terminal is prohibited, or setting data for executing power save control according to the location including lowering the brightness of the backlight indoors. Based on such information, the communication control section 14 performs various types of setting such that the wireless communication terminal 1 operates appropriately according to the location specified by the location specifying section 13.

[Operation]

Next, operation of the wireless communication terminal 1 having the above configuration will be described. First, with reference to FIG. 2, the outline of the operation of the wireless communication terminal 1 will be described. As shown in FIG. 2, the operation of the wireless communication terminal 1 is classified roughly into a measurement and learning operation (S10) and a location specifying operation (S20).

In the measurement and learning operation (S10), the wireless communication terminal 1 measures various types of parameters of a wireless communication status at each location for a certain period (step S11). Then, the wireless communication terminal 1 creates a template containing the measurement values (step S12), and stores the template for each location in the template storage section 22 (step S13). Thereby, templates in which location data and communication status data measured at that location are accumulated by each location and by each parameter type of the communication status. In this example, storing a template of a given location means leaning a template of such location. For example, a template measured at home is learned as a home template, and a template measured at the office is learned as an office template.

The wireless communication terminal 1 may distribute the created templates to another wireless communication terminal 1 by means of wireless communications, after performing the measurement and learning operation (S10). With this step, another wireless communication terminal may have templates of various types of communication statuses at each location in advance, without performing the measurement and learning operation (S10).

Further, the above-described template is not necessarily data measured at each location by the wireless communication terminal as described above. For example, the wireless communication terminal may store data measured by another device at each location or data obtained by logical calculation as the temple of each location.

Further, in the measurement and learning operation (S10), the wireless communication terminal 1 may operate in response to a trigger by a user, that is, an instruction for creating a template input at a particular location from a user, to thereby create a template of each location, and may delete a template in response to a trigger by a user. Further, by the measurement and learning operation (S10), the wireless communication terminal itself may determine a discrepancy between the learned template and a current communication status to thereby automatically create a new template and learn it. On the contrary, the wireless communication terminal may automatically delete a template which has not been used for a certain period.

Next, the outline of the location specifying operation (S20) will be described. In the location specifying operation (S20), the wireless communication terminal 1 measures a current wireless communication status for a certain period (step S21), compares it with the stored templates (step S22), and specifies the location of the wireless communication terminal 1 from the discrepancies (step S23). For example, the wireless communication terminal 1 measures a communication status, calculates discrepancies between it and a home template and an office template which have been stored, and specifies whether the wireless communication terminal 1 is at home or at the office currently.

Then, the wireless communication terminal 1 performs operation setting of the terminal 1 itself according to the specified location (step S24). For example, the wireless communication terminal 1 changes the wireless mode to be used, or performs setting to change the parameter of wireless communications in order to reduce the interference. Further, the wireless communication terminal 1 may secure the security by restricting use of the terminal at a location where use of the terminal is prohibited, or performs power save control according to the location by lowering the brightness of the backlight indoors. It should be noted that during the wireless communication terminal 1 being activated, the location specifying operation (S20) may always classify the current location or perform it when necessary in response to a trigger by the user.

Figure 3:
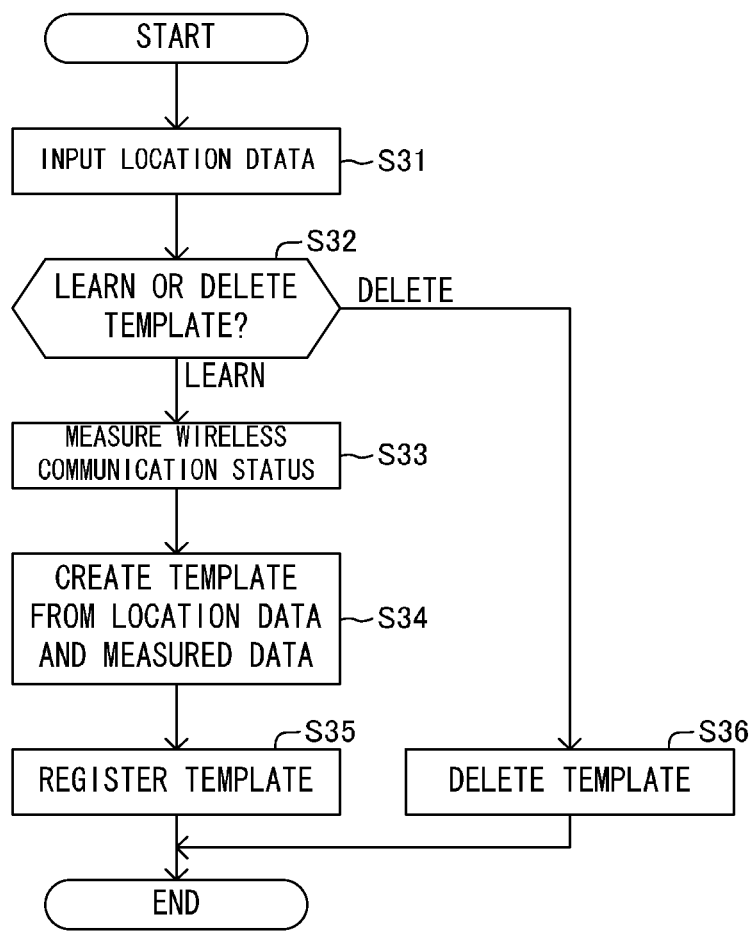
FIG. 3 is a flowchart showing the operation of the wireless communication terminal disclosed in FIG. 1.

Hereinafter, the details of the measurement and learning operation (S10) and the location specifying operation (S20), described above, will be given. FIG. 3 is a flowchart showing the details of the measurement and learning operation triggered by a user.

When being triggered by a user, the measurement and learning operation (S10) is started when the wireless communication terminal 1 receives location data input by a user, and the wireless communication terminal 1 learns or deletes a template (step S31). Then, based on an instruction of learning or deletion input by the user, in the case of learning a template (step S32: learn), the wireless communication terminal 1 acquires values of various types of parameters of the current wireless communication status for a certain period (step S33). Then, the wireless communication terminal 1 creates a template by associating the communication status data, which is time-series data of each parameter acquired, with the location data (step S34), and stores the template in the template storage section 22 (step S35).

At step S32, if the instruction input by the user is an instruction to delete a template (step S32: delete), the wireless communication terminal 1 deletes the template corresponding to the location data input by the user (step S36).

It should be noted that parameters of a wireless communication status include QoS values such as throughput, delay, and jitter of communication data at the time of wireless communications, network identifiers such as an address and an ID (identification), parameters indicating a communication availability status such as the number of retransmissions and the number of CRC errors, and parameters of a radio physical layer such as signal strength (RSSI), noise level (SNR), surrounding radio wave using statuses in various frequency bands, and a spectrum status, as described above. It is possible to use those parameters by combining those of different units or granularity to improve the accuracy of classification of a location where the terminal is placed, rather than using a single parameter.

Further, the values of time-series data may directly be used as a template, or it is possible to calculate statistical values such as probability distribution, standard deviation, an average value, and the like and use the values as a template. Further, it is also possible to determine a model optimum for describing the phenomenon using MDL (Minimum Description Length) principle.

Figure 4:
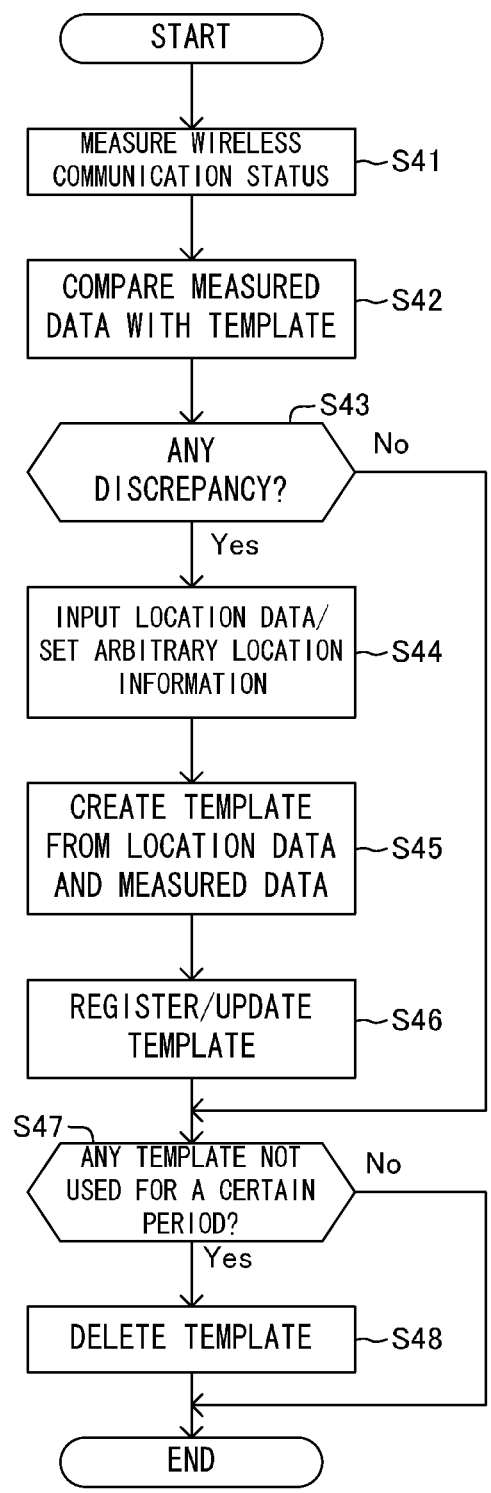
FIG. 4 is a flowchart showing the operation of the wireless communication terminal disclosed in FIG. 1.

Next, the measurement and learning operation (S10) for automatically learning or deleting a template will be described with reference to FIG. 4. In that case, first, the wireless communication terminal 1 acquires values of various types of parameters of a current communication status for a certain period (step S41). Then, the wireless communication terminal 1 compares the communication status data, which is a value of each parameter acquired, with the stored templates to determine the discrepancies between them (step S42). At this time, comparison between the communication status data and a template is performed by obtaining a scale of discrepancy by means of a preset calculation method, and if the scale is larger than a preset reference value for determining that they are different from each other (step S43: Yes), that is, if it is determined that it has a feature different from other registered templates, the measured communication status data is stored in the template storage section 22 as another new template, in association with the location data (steps S45 and S46). At this step, the location data may be input by the user, or an arbitrary location may be given automatically (step S44).

Then, the wireless communication terminal 1 specifies a template of a location which has not been specified for a certain period by the location specifying section 13 (step S47: Yes), and automatically deletes the template (step S48).

Next, the details of the location specifying operation (S20) triggered by a user will be described with reference to FIG. 5. In the location specifying operation (S20) triggered by a user, when the wireless communication terminal 1 receives an instruction to specify a location from the user, the wireless communication terminal 1 measures a wireless communication status of the current location, and stores it in the temporary storage section 21 (step S51). Then, the wireless communication terminal 1 compares the communication status data of the current location stored in the temporary storage section 21 with the templates of respective locations stored in the template storage section 22, and calculates the scales of discrepancies thereof (step S52). Then, based on the calculated scales of discrepancies, the wireless communication terminal 1 specifies the current location (step S53).

Specifically, the wireless communication terminal 1 first calculates a scale of a discrepancy between the measured communication status data and a template of a location (step S52), and then if there is a template of any other location (step S53: No), also calculates a scale of discrepancy between such template and the measured communication status data (step S52). Then, the wireless communication terminal 1 repeatedly calculates scales of discrepancies between the communication status data and all templates of the respective locations until there is no template to be compared with.

When comparison between the measured communication status data and all templates has been completed (step S53: Yes), the wireless communication terminal 1 specifies a template having the least discrepancy among the calculated scales, that is, a template determined to conform to the measured communication status data according to the preset criterion. Then, the wireless communication terminal 1 specifies the location corresponding to the location data contained in the specified template as a location of the wireless communication terminal 1 (step S54).

Then, the wireless communication terminal 1 outputs it to notify the user of the specified location or performs operation setting of the wireless communication terminal 1 based on the setting data stored in the terminal setting data storage section 23 according to the specified location (step S55). For example, the wireless communication terminal 1 performs security control and power save control, controls the wireless communication terminal 1 to adjust data transmission/reception parameters, changes the wireless mode to be used, or performs setting to change the wireless communication parameter such as a used frequency or transmission power (step S55).

Next, the details of constantly performing the location specifying operation (S20) will be described with reference to FIG. 6. First, the wireless communication terminal 1 measures a wireless communication status at certain intervals as described above (step S61), compares it with stored templates (steps S62, S63), specifies the location of the wireless communication terminal 1 (step S64), and performs setting control of the terminal according to the specified location (step S65). The wireless communication terminal 1 repeats this operation until the preset period has elapsed (step S66). Thereby, the operation of the wireless communication terminal 1 is constantly set appropriately according to the location where the wireless communication terminal 1 is placed.

Next, calculation of a scale of discrepancy described above will be given in detail. It should be noted that this calculation is performed at steps S42 and S43 disclosed in FIG. 4, steps S52 and S54 in FIG. 5, steps S62 and S64 in FIG. 6, at the time of calculating a scale of discrepancy when comparing measured communication status data with a template, and at the time of determining whether there is any discrepancy.

For example, calculation of a scale of discrepancy may be performed such that if each of measured communication status data and a template has a single value, a difference between the values can be calculated as a scale, and if the difference is smaller than a preset value, it is determined that there is no discrepancy. Further, if the values of measured communication status data and a template are vector amounts, a Euclidean distance can be used as a scale, and by comparing the value with a preset value, whether or not there is a discrepancy can be determined. Further, if the values of measured communication status data and a template are numbers or character strings such as network identifiers, it is possible to compare the numbers or character strings and the number in which they conform may be used as a scale, and it is possible to determine that there is no discrepancy if the number in which they conform is larger than a preset value.

Now, with reference to FIG. 7, an example of calculating a scale of discrepancy between measured communication status data and templates will be described. FIG. 7 shows an example in which network identifiers, such as a character string of ESSID in conformity with IEEE802.11, are used as communication status data and parameters of templates. In this case, it is assumed that the wireless communication terminal 1 is in an office, that self desk templates and conference room templates have been stored in the template storage section 22 as shown in FIG. 7, and that current measurement values are measured as shown in the lower part in FIG. 7. In comparison between the current measurement values and the network identifiers of the self desk templates, there is one current measurement value which does not conform with the self desk templates, and there are three current measurement values which do not conform with the conference room templates. In that case, as there are a larger number of current measurement values (measured communication status data) conforming with the self desk templates, a discrepancy with the self desk templates is low and the level of conformity is high. Thereby, the current location of the wireless communication terminal 1 can be specified as self desk.

Further, as a calculation of a scale of discrepancy, by using divergence which is an amount representing the information-theoretic gap with respect to a statistical value such as an average, standard deviation, or divergence, classification having higher robustness can be realized even in wireless communications in which fluctuations and singular points occur frequently.

For example, the following two divergences can be used as scales. A KL (Kullback-Leibler) divergence is an amount indicating a gap between probability distributions, which can be represented as Equation 1.

$$KL(P, Q) = \sum_{x \in X} \left[ P(x) \log\left(\frac{P(x)}{Q(x)}\right) \right]$$ [Equation 1]

In this equation, each of P and Q represents a function indicating a probability density distribution of parameters.

Further, a Jeffrey divergence is an amount in which a scale of discrepancy becomes symmetric, and when being applied to discrete distributions, it can be represented as the following Equation 2 and Equation 3.

$$JD(p, q) = \sum_i \left[ p_i \log\left(\frac{p_i}{m_i}\right) + q_i \log\left(\frac{q_i}{m_i}\right) \right] \quad \text{[Equation 2]}$$

$$m_i = \frac{p_i + q_i}{2} \quad \text{[Equation 3]}$$

In these equations, each of p and q represents a function indicating a discrete distribution of parameters, or data.

Each of KL(P,Q) and JD(p,q) in the above equations indicates that the values are closer as the obtained divergence value is closer to 0. By using these equations of scales, it is possible to calculate a discrepancy between the parameter of the currently measured communication status and the parameter of the stored template.

It should be noted that the above-described scale of discrepancy can be configured such that a different scale is used for each parameter so that a discrepancy for each parameter becomes remarkable. For example, it is possible to use a comparison result of character strings as a scale for an ID, use a KL divergence as a scale for RSSI which is one of wireless quality parameters, and use a Jeffrey divergence as a scale for a CRC error which is another parameter.

Then, for each of the parameters described above, a scale of discrepancy between the measured communication status data and a template is calculated, and a location having less discrepancy may be specified as the location of the wireless communication terminal 1. For example, a location common to a template determined to have no discrepancy in two different parameters may be specified as the location of the wireless communication terminal 1.

It should be noted that when specifying the location of the wireless communication terminal 1, while it is possible to specify the location of a template determined to have a lowest discrepancy, among the templates, with respect to the measured communication status data as the location of the wireless communication terminal 1, it is also possible to set a threshold beforehand to thereby specify the location having a discrepancy with a template within the threshold as the location of the wireless communication terminal 1. It should be noted that a threshold for a scale of discrepancy, serving as a reference for determining that a discrepancy is low, may be set arbitrary for each parameter, according to the characteristics of parameters or combinations of parameters. Further, the threshold for a scale of discrepancy may be set automatically by repeating the measurement and learning operation a plurality of times under the same conditions as described above, or repeating it a plurality of times under different conditions using different wireless parameters, and in accordance with dispersion of the results, setting a threshold with which the location is specified if the result is within the range of the dispersion.

Now, in order to confirm the effect of the present invention, a result of a test performed using actual wireless communication equipment will be described. In this test, a wireless system of IEEE802.11g, a packet length of 200 byte, and a physical transmission rate of 54 Mbps were used, two wireless communication terminals were paired, and throughputs were measured under a plurality of conditions indoors and outdoors.

FIG. 8 is a graph showing the results. In FIG. 8, the horizontal axis shows, from the left, results of a communication distance of 5 m at transmission data rates of 1 Mbps, 2 Mbps, 3 Mbps, and 4 Mbps, and a communication distance of 10 m at transmission data rates of 1 Mbps, 2 Mbps, 3 Mbps, and 4 Mbps, and further, a communication distance of 15 m at transmission data rates of 1 Mbps, 2 Mbps, 3 Mbps, and 4 Mbps. For either test performed indoors or outdoors, a histogram of throughput of a communication distance of 5 m at 4 Mbps was set as an outdoor template or an indoor template, and a KL divergence value (vertical axis) with another observed value was obtained.

From FIG. 8, KL divergence values obtained indoors (white bars) and outdoors (black bars) were remarkably different depending on the conditions in most cases. Even in the case where only throughput was used as a parameter, it was confirmed that the method of specifying the location using the discrepancy of the present invention is effective. Further, it was confirmed that classification was performed successfully with accuracy of 80% to 90% by setting only a throughput measured under almost similar conditions to those described above as a single parameter and using a Jeffrey divergence as a scale of discrepancy to perform classification between indoor locations and outdoor locations. As such, it is possible to perform classification with higher accuracy by combining a plurality of parameters of templates, as shown by the present invention.

As described above, according to the present invention, it is possible to specify the location of the self terminal only with the wireless communication terminal of a simple configuration, without providing any equipment such as GPS or using other facilities such as base stations. In particular, as data measured at a location where the wireless communication terminal is actually placed is registered as a template, it is possible to specify a location with higher accuracy according to the environment for the use by the user of a wireless communication terminal.

Further, when the location of a wireless communication terminal is specified, various types of setting is performed on the wireless communication terminal so as to allow the terminal to be in an operation state appropriate for the specified location. Accordingly, operation of the wireless communication terminal can be optimized automatically according to the location, whereby user-friendliness can be improved.

Further, as data representing a plurality of communication statuses are used and different scales of discrepancies are calculated for respective parameters to thereby specify the location according to the results, it is possible to specify the location of a wireless communication terminal with high accuracy even in wireless communications in which fluctuations or singular points occur frequently.

Second Exemplary Embodiment

A second exemplary embodiment of the present invention will be described with reference to FIG. 9. FIG. 9 is a function block diagram showing the configuration of a wireless communication terminal. In the present embodiment, the outline of the wireless communication terminal will be described.

As shown in FIG. 9, a wireless communication terminal 100 according to the present embodiment includes, a communication status measurement means 101 for measuring communication status data representing a communication status of the self terminal at the time of wireless communications;

a reference data storage means 103 for storing respective pieces of preset reference data representing communication statuses of a terminal which can be measured at respective locations at the time of wireless communications, in association with respective pieces of location data identifying the respective locations; and a location specifying means 102 for comparing the communication status data measured by the communication status measurement means 101 with the respective pieces of reference data stored in the reference data storage means 103, and based on the comparison result, specifying a location corresponding to the location data associated with a particular piece of reference data as a location of the self terminal.

In the wireless communication terminal 100, the location specifying means is adapted to specify, as the location of the self terminal, a location corresponding to the location data associated with the reference data in which a difference between the communication status data and the reference data, calculated by a predetermined calculation method, is the least.

According to the invention described above, first, the wireless communication terminal has stored pieces of reference data representing communication statuses which can be measured by a terminal at the time of wireless communications at respective locations beforehand, along with location information. Then, the wireless communication terminal measures communication status data representing a communication status when performing wireless communications at a predetermined location, and compares the communication status data with the reference data of the respective locations. As a result of comparison, the wireless communication terminal specifies a piece of reference data corresponding to the communication status data, and specifies the location associated with the reference data as a location of the terminal. Thereby, the location of the self terminal can be specified only with a wireless communication terminal of a simple configuration, without providing any equipment such as GPS or using other facilities such as base stations.

Further, a wireless communication terminal, according to another aspect of the present invention, is configured to include a reference data registration means for storing, in the reference data storage means, the communication status data measured by the communication status measurement means of the self terminal at a predetermined location as the reference data, in association with the location data identifying the predetermined location.

In the wireless communication terminal described above, the reference data registration means is adapted to compare the communication status data measured at a predetermined location by the communication status measurement means of the self terminal with the reference data stored in the reference data storage means, and based on the comparison result, store the measured communication status data as the reference data in the reference data storage means, in association with the location data identifying the predetermined location.

Further, in the wireless communication terminal described above, the reference data registration means is adapted such that if a difference between the communication status data measured by the communication status measurement means of the self terminal at a predetermined location and the reference data stored in the reference data storage means, calculated by a predetermined calculation method, is larger than a preset value, the reference data registration means stores the measured communication status data as the reference data in the reference data storage means, in association with the location data identifying the predetermined location.

Further, in the wireless communication terminal described above, the reference data registration means is adapted to delete, from the reference data storage means, the reference data associated with the location data identifying a location which has not been specified for a certain period by the location specifying means.

Thereby, as reference data is registered with use of data measured at a location where the wireless communication terminal is actually placed, there is no need to generate the reference data separately and a location can be specified by the wireless communication terminal alone, whereby the configuration can be more simplified. Further, as reference data according to the environment for the usage by the user of the wireless communication terminal can be registered, a location can be specified with higher accuracy.

Further, the wireless communication terminal described above includes a setting data storage means for storing setting data for setting an operation state of the wireless communication terminal preset for each of the locations, and an operation state setting means for setting an operation state of the self terminal based on the setting data corresponding to a location specified by the location specifying means.

In the wireless communication terminal described above, the setting data is data for setting an wireless communication operation of the wireless communication terminal.

Thereby, when the location of the wireless communication terminal is specified, the various kinds of setting are performed on the wireless communication terminal so as to allow the terminal to be in an operation state appropriate for the specified location. Accordingly, the operation of the wireless communication terminal can be optimized automatically corresponding to the location, whereby user-friendliness can be improved.

Further, in the wireless communication terminal described above, the communication status measurement means is adapted to measure a plurality of pieces of communication status data representing different communication statuses at one location, the reference data storage means is adapted to store a plurality of pieces of reference data representing different communication statuses at one location, and the location specifying means is adapted to compare the communication status data with the reference data, of a plurality of communication statuses, by each of the communication statuses, and specify the location of the self terminal based on the comparison result.

Thereby, as the location of the terminal is specified using data representing a plurality of communication statuses, the location can be specified with higher accuracy.

Further, the wireless communication terminal described above can be realized by installing a program in the wireless communication terminal. Specifically, a program, which is another aspect of the present invention, is a program for causing a wireless communication terminal which stores respective pieces of preset reference data representing communication statuses of a terminal which can be measured at respective locations at the time of wireless communications, in association with respective pieces of location data identifying the respective locations, to realize a communication status measurement means for measuring communication status data representing a communication status of the self terminal at the time of wireless communications, and a location specifying means for comparing the communication status data measured by the communication status measurement means with the respective pieces of stored reference data, and based on the comparison result, specifying a location corresponding to the location data associated with a particular piece of reference data as the location of the self terminal.

The program, described above, is a program for further causing the wireless communication terminal to realize a reference data registration means for storing the communication status data measured by the communication status measurement means of the self terminal at a predetermined location as the reference data, in association with the location data identifying the predetermined location.

Further, the program, described above, is a program for further causing the wireless communication terminal to realize an operation state setting means for setting an operation state of the self terminal based on setting data for setting an operation state of the wireless communication terminal which is preset corresponding to a location specified by the location specifying means.

Further, a wireless communication method, which is another aspect of the present invention, includes, by a wireless communication terminal which stores respective pieces of preset reference data representing communication statuses of a terminal which can be measured at respective locations at the time of wireless communications, in association with respective pieces of location data identifying the respective locations, measuring communication status data representing a communication status of the self terminal at the time of wireless communications, and comparing the measured communication status data with the respective pieces of stored reference data, and based on the comparison result, specifying a location corresponding to the location data associated with a particular piece of reference data as a location of the self terminal.

The wireless communication method, described above, further includes storing the communication status data measured by the communication status measurement means of the self terminal at a predetermined location as the reference data, in association with the location data identifying the predetermined location.

The wireless communication method, described above, further includes after specifying the location of the self terminal, setting an operation state of the self terminal based on setting data for setting an operation state of the wireless communication terminal which is preset corresponding to the specified location.

As the invention of a program or a wireless communication method, having the above configuration, also has action similar to that of the wireless communication terminal, such invention can achieve the above-described object of the present invention.

While the present invention has been described with reference to the exemplary embodiments thereof, the present invention is not limited to these embodiments. It will be understood by those skilled in the art that various changes in form and details may be made therein without departing from the scope of the present invention as defined by the claims.

This application is based upon and claims the benefit of priority from Japanese patent application No. 2009-197774, filed on Aug. 28, 2009, the disclosure of which is incorporated herein in its entirety by reference.

INDUSTRIAL APPLICABILITY

The present invention is applicable to portable wireless communication terminals such as laptop computers and mobile phones having communication functions, and has industrial applicability.

REFERENCE NUMERALS 1 wireless communication terminal
2 wireless communication processing section
3 antenna
11 communication status measurement section
12 communication status collecting section
13 location specifying section
14 communication control section
100 wireless communication terminal
101 communication status measurement means
102 location specifying means
103 reference data storage means
21 temporary storage section
22 template storage section
23 terminal setting data storage section

The invention claimed is:

1. A wireless communication terminal, comprising:
a communication status measurement unit that measures communication status data representing a communication status of a self terminal at a time of wireless communications by the self terminal;
a reference data storage unit that stores respective pieces of preset reference data representing communication statuses of a terminal which can be measured at respective locations at the time of wireless communications, in association with respective pieces of location data identifying the respective locations; and
a location specifying unit that compares i) the communication status data measured by the communication status measurement unit with ii) the respective pieces of reference data stored in the reference data storage unit to yield a comparison result, and based on the comparison result calculated by a predetermined calculation method, specifies a location corresponding to the location data associated with a particular piece of reference data as a location of the self terminal where the communication status data was measured, wherein
the location specifying unit specifies, as the location of the self terminal where the communication status data was measured, a location corresponding to the location data associated with the particular piece of reference data in which the predetermined calculation method calculates a least difference between the communication status data and the particular piece of reference data,
wherein the location specifying unit
i) calculates, by the predetermined calculation method, a divergence which is an amount representing an information-theoretic gap with respect to a statistical value, as the difference between the communication status data and the reference data, and
ii) specifies, as the location of the self terminal, a location corresponding to the location data associated with the reference data in which a value of the divergence is the least.

2. The wireless communication terminal, according to claim 1, further comprising
 a reference data registration unit that stores, in the reference data storage unit, the communication status data measured by the communication status measurement unit of the self terminal at a predetermined location as the reference data, in association with the location data identifying the predetermined location.

3. The wireless communication terminal, according to claim 2, wherein
 the reference data registration unit compares the communication status data measured at a predetermined location by the communication status measurement unit of the self terminal with the reference data stored in the reference data storage unit, and based on a comparison result, stores the measured communication status data as the reference data in the reference data storage unit, in association with the location data identifying the predetermined location.

4. The wireless communication terminal, according to claim 3, wherein when a difference between the communication status data measured by the communication status measurement unit of the self terminal at a predetermined location and the reference data stored in the reference data storage unit, calculated by a predetermined calculation method, is larger than a preset value, the reference data registration unit stores the measured communication status data as the reference data in the reference data storage unit, in association with the location data identifying the predetermined location.

5. The wireless communication terminal, according to claim 4, wherein
 the reference data registration unit deletes, from the reference data storage unit, the reference data associated with the location data identifying a location which has not been specified for a certain period by the location specifying unit.

6. The wireless communication terminal, according to claim 3, wherein
 the reference data registration unit deletes, from the reference data storage unit, the reference data associated with the location data identifying a location which has not been specified for a certain period by the location specifying unit.

7. The wireless communication terminal, according to claim 2, wherein
 the reference data registration unit deletes, from the reference data storage unit, the reference data associated with the location data identifying a location which has not been specified for a certain period by the location specifying unit.

8. The wireless communication terminal, according to claim 2, further comprising:
 a setting data storage unit that stores setting data for setting an operation state of the wireless communication terminal preset for each of the locations, and
an operation state setting unit that sets an operation state of the self terminal based on the setting data corresponding to a location specified by the location specifying unit.

9. The wireless communication terminal, according to claim 1, further comprising:
 a setting data storage unit that stores setting data for setting an operation state of the wireless communication terminal preset for each of the locations, and
 an operation state setting unit that sets an operation state of the self terminal based on the setting data corresponding to a location specified by the location specifying unit.

10. The wireless communication terminal, according to claim 9, wherein the setting data is data for setting a wireless communication operation of the wireless communication terminal.

11. The wireless communication terminal, according to claim 1, wherein
 the communication status measurement unit measures a plurality of pieces of communication status data representing different communication statuses at one location,
 the reference data storage unit stores a plurality of pieces of reference data representing different communication statuses at one location, and
 the location specifying unit compares the communication status data with the reference data, of a plurality of communication statuses, by each of the communication statuses, and specifies the location of the self terminal based on a comparison result.

12. The wireless communication terminal, according to claim 1, wherein,
 the communication status measurement unit measures a plurality of pieces of communication status data representing respectively different communication statuses at one location,
 the reference data storage unit stores a plurality of pieces of reference data representing respectively different communication statuses at one location, and
 the location specifying unit compares, the communication status data with the reference data, of a plurality of communication statuses, by using difference scales each of which is preset per communication status, in which a Kullback-Leibler divergence is used as the scale for a certain communication status and a Jeffrey divergence is used as the scale for the other communication status, and specifies the location of the self terminal based on a comparison result.

13. A non-transitory computer readable medium storing a program comprising instructions for causing a wireless communication terminal which stores respective pieces of preset reference data representing communication statuses of a terminal which can be measured at respective locations at the time of wireless communications, in association with respective pieces of location data identifying the respective locations, to realize:
 a communication status measurement unit that measures communication status data representing a communication status of a self terminal at the time of wireless communications, and
 a location specifying unit that compares the communication status data measured by the communication status measurement unit with the respective pieces of stored reference data, and based on a comparison result calculated by a predetermined calculation method, specifies a location corresponding to the location data associated with a particular piece of reference data as a location of the self terminal where the communication status data was measured,
  wherein the location specifying unit specifies, as the location of the self terminal where the communication status data was measured, a location corresponding to the location data associated with the particular piece of reference data in which the predetermined calculation method calculates a least difference between the communication status data and the particular piece of reference data, and wherein the location specifying unit
- i) calculates, by the predetermined calculation method, a divergence which is an amount representing an information-theoretic gap with respect to a statistical value, as the difference between the communication status data and the reference data, and
- ii) specifies, as the location of the self terminal, a location corresponding to the location data associated with the reference data in which a value of the divergence is the least.

14. The non-transitory computer readable medium storing the program, according to claim 13, further causing the wireless communication terminal to realize a reference data registration unit that stores the communication status data measured by the communication status measurement unit of the self terminal at a predetermined location as the reference data, in association with the location data identifying the predetermined location.

15. The non-transitory computer readable medium storing the program, according to claim 13, further causing the wireless communication terminal to realize an operation state setting unit that sets an operation state of the self terminal based on setting data for setting an operation state of the wireless communication terminal which is preset corresponding to a location specified by the location specifying unit.

16. A wireless communication method comprising, by a wireless communication terminal which stores respective pieces of preset reference data representing communication statuses of a terminal which can be measured at respective locations at the time of wireless communications, in association with respective pieces of location data identifying the respective locations:

measuring communication status data representing a communication status of a self terminal at the time of wireless communications, and comparing the measured communication status data with the respective pieces of stored reference data, and based on a comparison result calculated by a predetermined calculation method, specifying a location corresponding to the location data associated with a particular piece of reference data as a location of the self terminal where the communication status data was measured, wherein the comparing step specifies, as the location of the self terminal where the communication status data was measured, a location corresponding to the location data associated with the particular piece of reference data in which the predetermined calculation method calculates a least difference between the communication status data and the particular piece of reference data, and wherein the location specifying step
- i) calculates, by the predetermined calculation method, a divergence which is an amount representing an information-theoretic gap with respect to a statistical value, as the difference between the communication status data and the reference data, and
- ii) specifies, as the location of the self terminal, a location corresponding to the location data associated with the reference data in which a value of the divergence is the least.

17. The wireless communication method, according to claim 16, further comprising storing the communication status data measured by the self terminal at a predetermined location as the reference data, in association with the location data identifying the predetermined location.

18. The wireless communication method, according to claim 16, further comprising after specifying the location of the self terminal, setting an operation state of the self terminal based on setting data for setting an operation state of the wireless communication terminal which is preset corresponding to the specified location.

* * * * *

UNITED STATES PATENT AND TRADEMARK OFFICE
CERTIFICATE OF CORRECTION

| | |
|---|---|
| PATENT NO. | : 9,037,117 B2 |
| APPLICATION NO. | : 13/391077 |
| DATED | : May 19, 2015 |
| INVENTOR(S) | : Stefan Aust et al. |

Page 1 of 1

It is certified that error appears in the above-identified patent and that said Letters Patent is hereby corrected as shown below:

On the title page, please amend Item (22) to read as follows:

-- (22) PCT Filed: August 24, 2010 --

Signed and Sealed this
Eighth Day of September, 2015

Michelle K. Lee
*Director of the United States Patent and Trademark Office*